United States Patent [19]

Antes et al.

[11] Patent Number: 4,685,138

[45] Date of Patent: Aug. 4, 1987

[54] SYSTEM FOR THE DISPLAY AND SCANNING OF THE CONTENTS OF A COUNTER EQUIPPED WITH COUNTING WHEELS

[75] Inventors: Gregor Antes, Zurich; Mathis Halder, Baar; Paul Fuchs, Küssnacht; Peter Gehr, Cham, all of Switzerland

[73] Assignee: LGZ Landis & Gyr Zug AG, Zug, Switzerland

[21] Appl. No.: 666,113

[22] Filed: Oct. 29, 1984

[30] Foreign Application Priority Data

Nov. 3, 1983 [CH] Switzerland .................. 5943/83

[51] Int. Cl.$^4$ .................. G06K 9/18; G06K 19/00
[52] U.S. Cl. ................ 382/12; 235/468; 235/488; 283/94; 283/901; 350/102; 350/162.23
[58] Field of Search ............ 250/568; 382/11, 12; 235/462, 463, 468, 472, 487, 488; 340/783, 784; 377/114; 350/162.23, 102; 283/17, 94, 901; 40/442–444, 582, 584, 615

[56] References Cited

U.S. PATENT DOCUMENTS

| | | | |
|---|---|---|---|
| 1,741,201 | 12/1929 | Peirce | 235/494 |
| 2,609,928 | 9/1952 | Doust | 235/494 |
| 3,755,935 | 9/1973 | Annenberg | 283/94 |
| 3,832,686 | 8/1974 | Bilgutay | 382/11 |
| 4,085,314 | 4/1978 | Schultz et al. | 235/487 |
| 4,184,700 | 1/1980 | Greenaway | 283/17 |
| 4,538,059 | 8/1985 | Rudland | 235/468 |

FOREIGN PATENT DOCUMENTS

| | | |
|---|---|---|
| 81/110234.2 | 12/1981 | European Pat. Off. . |
| 6803441 | 12/1980 | Fed. Rep. of Germany . |
| 815124 | 8/1955 | Netherlands . |
| 586431 | 3/1976 | Switzerland . |
| 2018069A | 3/1979 | United Kingdom . |

*Primary Examiner*—Leo H. Boudreau
*Assistant Examiner*—Jose L. Couso
*Attorney, Agent, or Firm*—Marmorek, Guttman & Rubenstein

[57] ABSTRACT

In a system for optical display and photo-electric scanning of the contents of a counter equipped with counting wheels, and wherein each counting wheel includes a plurality of numeral members visually distinguishable from the periphery thereof, a coded optical marking member is associated with each numeral member of a respective counting wheel. The coded optical marking member includes at least one optical surface element, and the optical marking members of the counting wheels extend along respective rows, and may be scanned by a light ray moving along a corresponding row. The improvement includes one of the members being superimposed at least in part onto another of the members in a corresponding row, and being partially light-transmitting, while each optical surface element is light-reflective, so that the numeral members are visible upon being illuminated with diffuse light, but wherein a light ray directed onto a respective optical surface element is reflected therefrom.

8 Claims, 6 Drawing Figures

SYSTEM FOR THE DISPLAY AND SCANNING OF THE CONTENTS OF A COUNTER EQUIPPED WITH COUNTING WHEELS

BACKGROUND OF THE INVENTION

The invention relates to a system for the optical display and the photoelectric scanning of the contents of a counter equipped with counting wheels.

A system of this type is known (GB-A No. 2,018,069) in which, for the display of the contents of an electric counter equipped with counting wheels, optical markings consisting in each case of four individual lines, are assigned to the numerals in question of the counting wheels. Different respective line thicknesses make possible the selection of a certain code. The scanning of the reflecting line pattern takes place by means of a light pen, which is guided along the row of the individual lines, which is the reason why the four individual lines of each individual marking have to be arranged sequentially in the same scanning direction. This type of marking requires a relatively large total surface, so that on the outer surface or periphery of the counting wheel, only a small free area remains for the visually readable nunbers; the visual reading of the contents of the counter is consequently made considerably more difficult. The markings which catch the eye also disturb the esthetic effect of the counter.

It is also known (EP-A No. 0,060,937) to use diffraction-optical elements, such as, for example, holograms or diffraction gratings, as markings, which are impressed onto a thin transparent sheeting and cover the numerals of the counting wheels, so that the numerals are visible through the holograms or diffraction grating. However, the reading of the contents of the counter represented by such diffraction-optical elements, makes it necessary that the light transmitter and the light receiver are arranged at a predetermined spatial angle, and consequently cannot be carried out easily by means of a manually guided light pen.

From U.S. Pat. No. 4,085,314 it is also known to produce coded markings from reflecting material, which, for example, serve for the characterization of groceries.

German Pat. No. 6 80 34 441.8 relates to a counter, including a reading arrangement, but where the coding requires a space separate from that of the numerals on the counting wheels.

British patent specification No. 815,124 relates to improvements in counter mechanisms with movable indicating fields, each bearing a visually readable symbol, and a coded representation of a symbol adapted to yield a distinctive electrical response when the field or an image thereof is scanned by electrical scanning means. The visually readable symbol and the coded representations are at least partially superimposed on each other, while the visually readable symbol is in a form which does not yield such a response. The counter mechanism requires, however, light sensitive means adapted to respond to the coded representation only of the illuminated field, and means controlled directly or indirectly by the light sensitive means for generating one or more electrical signals in accordance with the coded representation. The color of the light provided by the illuminating means, and the spectral density of the light sensitive means have been so chosen in relation to colors of the coded representations, the visually readable symbols, and the background of the indicating fields, that only the coded representations are distinguished by the light sensitive means.

Swiss Pat. No. 586,431 relates to a method for determining information on an information carrier, wherein a portion consists of a design in the form of perforations representing, in turn, a pattern corresponding to alphanumeric symbols; this patent does not relate to any counters as such.

SUMMARY OF THE INVENTION

The invention has as its object the improvement of a system of the aforedescribed type in such a manner, so that the markings by themselves require no space on the counting wheels, do not disturb the numeral image appearing to the observer, but nevertheless make possible a complete and reliable scanning.

This object is attained in a system of the aforedescribed kind by photo-electrically scanning the contents of a counter equipped with counting wheels, each counting wheels including a plurality of numeral members visually distinguishable from the periphery thereof, a coded optical marking member being associated with each numeral member of a respecting counting wheel, the coded optical marking member including at least one optical surface element, the optical marking members of the counting wheels extending along respective rows, and being scannable by a light ray moving along a corresponding row, by one numeral member or one marking member being superimposed at least in part onto another in a corresponding row, and being partially light-transmitting, each optical surface element being light retroreflecting, so that the numeral members are visible upon being illuminated with diffuse light, but wherein a light ray directed onto a respective optical surface element is retroreflecting therefrom.

BRIEF DESCRIPTION OF THE DRAWING

For a fuller understanding of the nature and objects of the invention, reference should be had to the following detailed description, taken in connection with the accompanying drawings, in which.

DESCRIPTION OF THE PREFERRED EMBODIMENTS

Figure 1:
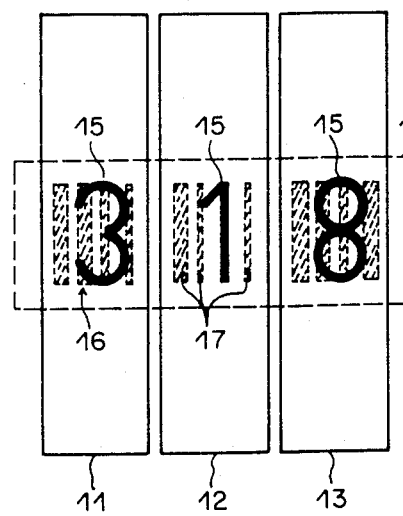
FIG. 1 is a basic illustration of a counter.

In FIG. 1, 11 to 13 denote the counting wheels of an electric counter, which, for example, can be arranged in the counter behind a counter window 14. On their outer surface, each of the counting wheels 11 to 13 bear reference numerals 15, for example the numerals 0, 1, 2 . . . 9, or 00, 10, 20 . . . 90. For reasons of illustrative simplicity, only those numerals 15 of the counting wheels 11 to 13 are shown, which are visible in the counter window 14. The contents or state of the counter at a given time can be read through the counter window 14 with the naked eye.

To each numeral 15 of the coded wheels 11 to 13, there is assigned a coded optical marking which, in the example of FIG. 1, consists in each case of four rod- or bar-shaped optical surface elements 17 of different respective widths. The markings 16, or their surface elements 17, are located on the outer surface of the counting wheels 11 to 13 on top of the numerals 15, namely they cover the numerals 15 at least in part. The markings or marking members 16 of the different counting wheels 11 to 13—in the same manner as the numerals 15—are arranged in one row each. For reasons of simplicity, only those markings 16 which show up in the counter window 14 are graphically represented in FIG. 1.

The markings 16 are scanned in a known manner by means of a light pen, which is not illustrated, which contains a light transmitter and a light receiver, and the tip of which is moved manually, for example from left to right, over the counter window 14, and therewith along the row of markings 16. The light receiver is connected to an electrical evaluation circuit, in which the electrical signals provided by the light receiver are decoded, and the contents of the counter are stored.

The optical surface elements 17 of the markings 16 consist of a partially light-permeable and partially retroreflecting material, so that at a diffuse illumination, the numerals 15 can be seen through the surface elements 17, whereas a portion of the directional scanning light-ray of the light pen is retroreflecting from the surface elements 17 within a spatial angle of about 4°, and falls back onto the light receiver of the light pen. Consequently, at a diffuse illumination, the markings 16 or their surface elements 17 are barely visible by the naked eye, and therefore do not disturb the numeral display offered to the naked eye. On the other hand, the retroreflected portion of the directional scanning light ray can be reliably detected.

Figure 2:
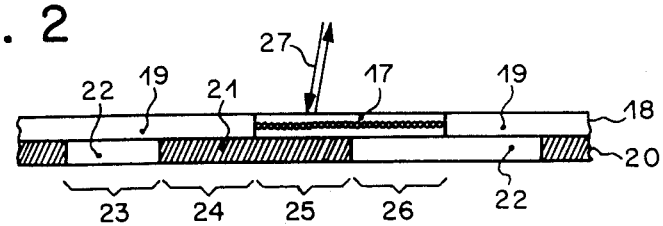
FIG. 2 is a cross-section of the rim zone of a counting wheel.

By means of FIG. 2, understanding of the invention is to be further increased. The external peripheral or shell surface of the counting wheels 11 to 13, which contains the retroreflecting surface elements 17, is designated by the numeral 18 in FIG. 2. The areas of the peripheral surface of the counting wheels 11 to 13, which are not covered by the surface elements 17, can remain free or, in accordance with FIG. 2, can be covered by a transparent, preferably mat layer 19, which has the same thickness as the reflecting surface elements 17, so that an even peripheral surface results. Underneath the external peripheral surface 18, there lies an internal peripheral surface 20, in which the numerals 15 (FIG. 1) are inscribed, and which accordingly consists, for example, of black surface areas 21, and white, diffusely reflecting surface areas 22.

The superimposition of the retroreflecting surface elements 17 and the numerals 15 results in four different optical areas 23 to 26. The area 23 contains the transparent layer 19 and a white surface area 22, the area 24 contains the transparent layer 19 and a black surface area 21; the area 25 contains the retroreflecting surface element 17 and a black surface area 21; the area 26 contains a retroreflecting surface element 17, and a white surface area 22.

The areas 23, 26 appear white to the naked eye, and the areas 24, 25 appear black. In the case of a diffuse illumination, the retroreflecting surface element 17 is not disturbing, particularly when the layer 19 is mat or dull and scatters diffuse light in a similar manner as the retroreflecting surface element 17. A directional scanning beam 27 is retroreflected from the areas 25 and 26. These areas appear light to the light receiver of the light pen. However, the areas 23 and 24 appear dark to the light receiver, since they scatter the scanning light beam 27.

The external peripheral or shell surface 18 preferably consists of a single, dull, partially light-permeable thin sheeting made of synthetic material which, according to the code of the markings 16, is retroreflective in certain zones and, for example, is affixed by means of an adhesive to the shell or peripheral surface of the counting wheels 11 to 13.

Figure 3:
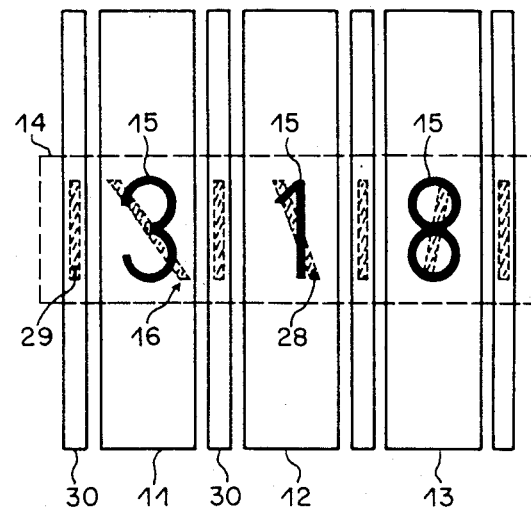
FIG. 3 is a basic illustration of an alternate counter.

In FIG. 3, the same reference numerals as those in FIG. 1 denote the same or similar component parts. Each of the markings 16 consists here of a single rod- or bar-shaped reflecting surface element 28, the angular position of which (angle $\alpha$ in FIGS. 4 and 5) represents the associated numeral. In the row of markings 16, which can be scanned through the counter window 14, invariably positioned bar-shaped and retroreflecting reference markings 29 are provided which, in the illustrated example, are oriented parallel to the front face of the counting wheels 11 to 13, and in each case are arranged on respective bars between two counting wheels, as well as at the beginning and at the end of a row.

Figure 4:
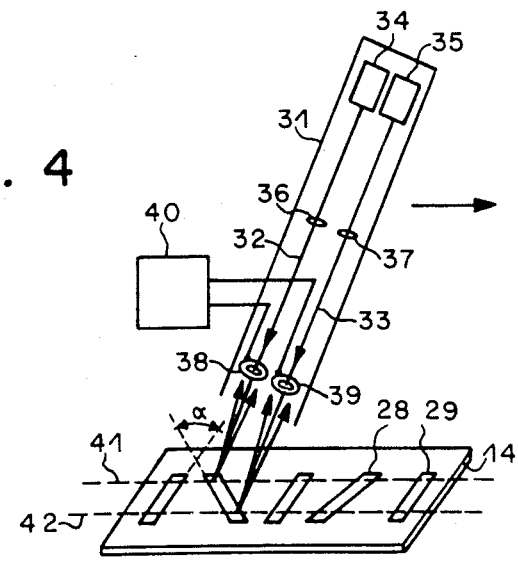
FIG. 4 is a basic illustration of scanning by means of a light pen.

A light pen serves for the scanning of the contents of the counter equipped with counting wheels according to FIG. 3, the light pen being designated with 31 in FIG. 4. The light pen is equipped for the transmission and reception of two parallel scanning beams 32, 33, and for this purpose includes two light sources (for example semiconducting lasers) 34, 35, two lens systems 36, 37, as well as two light receivers 38, 39. In the place of the two light sources 34, 35, one can also use a single light source and a beam divider. The light receivers 38, 39 are connected to an evaluation circuit 40. During the scanning, the light pen 31 is guided manually in the direction of the arrow above the counter window 14, so that the two scanning beams 32, 33 scan the reference markings 29, which lie in one row, and scan the surface elements 28 along two parallel scanning tracks 41, 42.

Figure 5:
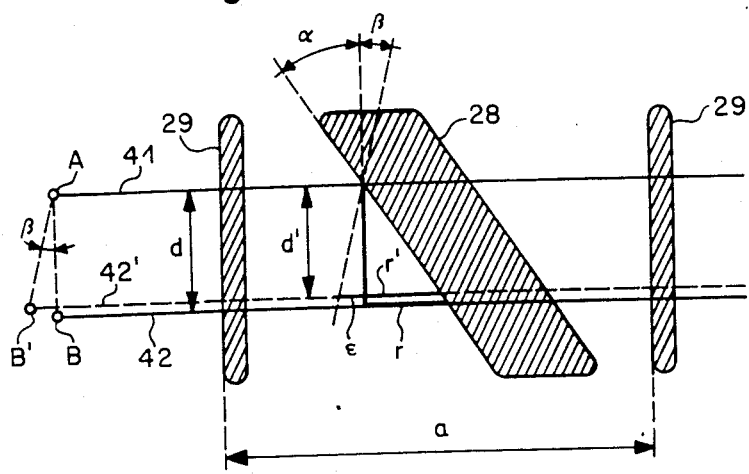
FIG. 5 is a large-scale illustration of the marking members.
Figure 6:
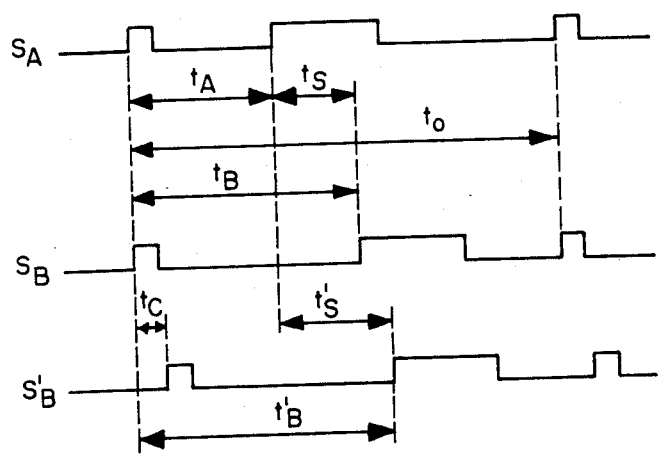
FIG. 6 is a pulse diagram of pulses obtained when scanning a counting wheel, according to the present invention.

Making reference to FIGS. 5 and 6, the mode of operation of the evaluation circuit 40, which preferably includes a micro-computer, is explained in more detail. In FIG. 5, A denotes the light focus of the scanning beam 32 on the scanning track 41, and B denotes the light focus of the scanning beam 33 on the scanning track 42, for the case in which the connecting line A-B is perpendicular to the scanning tracks 41, 42 and consequently extends parallel to the reference markings 29; this can be enforced, in that suitable guiding means for the light pen 31 are arranged on the counter window 14. The distance between the scanning tracks 41, 42 is designated by d, the path difference of the light foci A, B during the scanning of a surface element 28 is designated by r, and the distance between two reference markings 29 is designated by a.

The electrical signals $S_A$ or $S_B$, which are generated in the light receiver 38 or 39 and are formed in the evaluation circuit 40 by means of a threshold switch, are illustrated in FIG. 6. The time intervals between a pulse produced by a reference marking 29 and a pulse produced by a subsequent surface element 28 are designated by $t_A$ and $t_B$, and the time interval between pulses produced by two adjacent reference markings 29 is designated by $t_o$. The following applies, namely that $r = d \cdot \tan \alpha$ and therefore $t_A - t_B = t_S$. Accordingly, the following relationship results, namely:

$$\frac{t_A}{t_o} - \frac{t_B}{t_o} = \frac{t_S}{t_o} = \frac{r}{a} = \frac{d}{a} \cdot \tan\alpha \quad (1)$$

Since d and a are constant quantities, the angle $\alpha$ can be calculated from the measured values for $t_S$ and $t_o$.

If, during the scanning operation, the light pen 31 is rotated by the angle $\beta$ (FIG. 5) in regard to the line extending perpendicularly to the scanning tracks 41, 42, the light focus B moves to a light focus B'. The distance d' between the scanning tracks 41, 42', then amounts to $d' = d \cdot \cos \beta$, and the path-difference r' can then be expressed as $r' = d' \cdot \tan \alpha = d \cdot \cos\beta \cdot \tan \alpha$. Through the lateral displacement of the light focus B' with respect to the light focus B, an additional path-difference $\epsilon = d \cdot \sin \beta$, results, which manifests itself in a time lag $t_C$ in the signal $S_B'$. Thus, the following applies:

$$\frac{t_A}{t_o} - \frac{t_B'}{t_o} = \frac{t_S'}{t_o} = \frac{r' + \epsilon}{a} = \frac{d}{a}(\sin\beta + \tan\alpha \cdot \cos\beta) \quad (2)$$

and as far as angle $\beta$ is concerned, the following applies, namely:

$$\sin\beta = \frac{a}{d} \cdot \frac{t_C}{t_o} \quad (3)$$

The evaluation circuit 40 ascertains the time intervals $t_A$, $t_B'$, $t_C$ and $t_o$, and from the signals $S_A$ and $S_B'$, calculates the angle $\alpha$ of the surface elements 28 in accordance with equations (2) and (3); it also ascertains the numeral of the corresponding counting wheel 11 to 13 assigned to the angle $\alpha$, and stores the contents of the counter which has been read in this manner.

For the measuring of the different time intervals, not only the leading edges of the signals $S_A$ and $S_B$ or $S_B'$ are used, as it has been described above for reasons of simplicity, but also the trailing edges are used, and the mean value is formed from these two time intervals. The reliability of scanning can be increased thereby. Furthermore, it is advantageous to arrange on each reference bar 30 (FIG. 3) sequentially two reference markings 29 in the scanning direction, which permits formation of the mean value of the four pulse edges or pulses.

The above-described representation of the numerals 15, in each case through a single bar-shaped surface element 28, has the advantage of an especially simple coding, and yields an optimum utilization of the space at one's disposal on the counting wheels 11 to 13.

Suitable material for the partially permeable, retroreflecting surface elements 17, 28 can be obtained on the market in the form of thin sheetings of synthetic material, for example, the material marketed by the 3M Co. under the designation "Confirm Security Film". Such a thin sheeting made of synthetic material splits the scanning light beams 27, 32 or 33 into a retroreflecting beam (spatial angle of about 4°), into a diffusely reflecting portion, and into a beam passing through the thin sheeting made of synthetic material, so that the intensity of the retroreflecting beam lies in the order of magnitude of approximately 3%, while that of the diffusely reflecting portion lies in the order of magnitude of approximately 17%. The portion passing through the thin sheeting made of synthetic material, that is to say the surface elements 17, 28 (of an intensity of about 80%), is absorbed in the internal peripheral or shell layer 20 (FIG. 2), or is diffusely scattered therefrom.

The general inventive concept which is the basis of the invention which has been described with reference to FIGS. 1 to 3, can also be realized in that the numerals 15 consist of a partially permeable material, and in that the optical surface elements 17, 28 consist of a retroreflecting, preferably light-impermeable material, and in that the numerals 15, at least in part, cover the optical surface elements 17, 28. In the case of any diffuse illumination, the numerals 15 are then visible on the peripheral background of the counting wheels 11 to 13, the peripheral surface being partially covered with the optical surface elements. On the other hand, the directional scanning light beam 27, 32, 33 is retroreflected from the optical surface elements 17, 28 and can be reliably detected with the aid of the light pen 31. The retroreflecting surface elements 17, 28 in particular do not disturb the numerical image when the areas of the peripheral surface of the counting wheels 11 to 13, which are not covered by such surface elements, are mat or dull and scatter diffuse light in a manner similar to that of the surface elements 17, 28.

We wish it to be understood that we do not desire to be limited to the exact details of construction shown and described, for obvious modifications will occur to a person skilled in the art.

Having thus described the invention, what we claim as new and desire to be secured by Letters Patent is as follows:

1. A system for visually displaying and photoelectrically scanning a counter including counting wheels having respective peripheries, comprising
    a plurality of numeral members associated with and located on the respective peripheries of said counting wheels, said numeral members being visible under diffused light;
    optical marking means associated with each numeral member and coded for its associated numerical member, each of said optical marking means including an optical surface element at least partially light permeable and comprising retroreflective material, each of said optical surface elements being at least partially superimposed on its associated numeral member and being arranged generally in a row;
    said numeral members and associated optical marking means being dimensioned and having optical properties so that illumination of one of said numeral members and its associated optical marking means with diffused light results in good visibility of said numeral members and poor visibility of its associated optical marking means while illumination of the same numeral member and optical marking means with a directed light at a predetermined incidence angle to the optical marking means results in good visibility of said optical marking means and poor visibility of its associated numeral members in the vicinity of said incidence angle;
    wherein the optical marking means associated with each numeral member is photoelectrically scannable.

2. A system as claimed in claim 1, further comprising a mat synthetic material coated on each of said peripheries, said mat synthetic material being at least partially light transmissive and at least partially retroreflective in predetermined zones.

3. A system as claimed in claim 1, wherein each of said rows generally defines an axis, and said optical surface elements are rod-like in shape and are arranged at a predetermined angle to the axis of the row defined by said optical surface elements so that said angle is suitable for coding the value of its associated numeral member, said system further comprising additional optical surface elements arranged at a predetermined fixed angle to the axis of said row so that said additional optical surface elements are suitable as reference markings.

4. The system as claimed in claim 1, wherein each of said optical surface elements are arranged at a predetermined angle to the row defined by said optical surface elements so that said angle is suitable for coding the value of its associated numeral member, and further comprising light generating means operable for generating two directed light rays which can produce two corresponding retroreflective light rays from said retroreflective material, light receiving means including two light receivers for receiving said respective two retroreflected light rays from said retroreflective material, said light receiving means generating pulsed electric signals in response to receiving said reflected light rays, each of said pulsed electric signals having leading and trailing edges spaced at time intervals correlated to said predetermined angle, and evaluation circuit means connected to said light receiving means and operable for receiving said pulsed electric signals and determining said coded value.

5. A system for visually displaying and photoelectrically scanning a counter including counting wheels having respective peripheries, comprising
 a plurality of numeral members being partially light permeable associated with and located on the respective peripheries of said counting wheels, said numeral members being visible under diffused light;
 optical marking means associated with each numeral member and coded its associated numerical member, each of said optical marking means including an optical surface element comprising retroreflective material, each of said numeral members being at least partially superimposed on its associated optical surface elements and said optical surface elements being arranged generally in a row;
 said numeral members and associated marking means having the optical properties so that illumination of one of said numeral members and its associated optical marking means with diffused light results in good visibility of said numeral members and poor visibility of its associated optical marking means while illumination of the same numeral member and optical marking means with a directed light at a predetermined incidence angle to the optical marking means results in good visibility of said optical marking means and poor visibility of its associated numeral members in the vicinity of said incidence angle;
 wherein the optical marking means associated with each numeral member is photoelectrically scannable.

6. A system as claimed in claim 5, further comprising a mat synthetic material coated on each of said peripheries, said mat synthetic material being at least partially light transmissive and at least partially retroreflective in predetermined zones.

7. A system as claimed in claim 5, wherein each of said rows generally defines an axis, and said optical surface elements is rod-like in shape and is arranged at a predetermined angle to the axis of said row so that said angle is suitable for coding the value of its associated numeral member, said system further comprising additional optical surface elements arranged at a predetermined fixed angle to the axis of said row so that said additional optical surface elements are suitable as reference markings.

8. The system as claimed in claim 5, wherein each of said optical surface elements are arranged at a predetermined angle to said row so that said angle is suitable for coding the value of its associated numeral member and further comprising light generating means for generating two directed light rays, light recceiving means including two light receivers for receiving respective two retroreflected light rays from said retroreflective material, said light receiving means generating pulsed electric signals in response to receiving said reflected light rays, each of said pulsed electric signals having leading and trailing edges spaced at time intervals correlated to said predetermined angle, and evaluation circuit means connected to said light receiving means and operable for receiving said pulsed electric signals and determining said coded value.

* * * * *